United States Patent
Liu et al.

(10) Patent No.: US 11,601,985 B2
(45) Date of Patent: Mar. 7, 2023

(54) WIRELESS COMMUNICATION METHOD, BASE STATION, AND USER EQUIPMENT USING A PHYSICAL RANDOM ACCESS CHANNEL

(71) Applicant: NTT DOCOMO, INC., Tokyo (JP)

(72) Inventors: Le Liu, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 644 days.

(21) Appl. No.: 16/329,660

(22) PCT Filed: Sep. 28, 2017

(86) PCT No.: PCT/US2017/054146
§ 371 (c)(1),
(2) Date: Feb. 28, 2019

(87) PCT Pub. No.: WO2018/064404
PCT Pub. Date: Apr. 5, 2018

(65) Prior Publication Data
US 2021/0289562 A1 Sep. 16, 2021

Related U.S. Application Data

(60) Provisional application No. 62/401,649, filed on Sep. 29, 2016.

(51) Int. Cl.
*H04W 74/08* (2009.01)
*H04B 7/06* (2006.01)
(Continued)

(52) U.S. Cl.
CPC ...... *H04W 74/0841* (2013.01); *H04B 7/0617* (2013.01); *H04B 7/0695* (2013.01);
(Continued)

(58) Field of Classification Search
CPC . H04W 74/0841; H04W 74/02; H04W 16/28; H04W 74/006; H04W 74/0891;
(Continued)

(56) References Cited

U.S. PATENT DOCUMENTS

| 10,945,224 B2* | 3/2021 | Yu ........................ H04W 48/12 |
| 2013/0336295 A1* | 12/2013 | Dinan ...................... H04L 5/00 370/336 |

(Continued)

FOREIGN PATENT DOCUMENTS

| WO | WO-2015115376 A1 * | 8/2015 | ............ H04L 5/005 |
| WO | 2016/086144 A1 | 6/2016 | |

OTHER PUBLICATIONS

3GPP TSG-RAN WG1 Meeting #85; "RAN1 Chairman's Notes;" Nanjing, China; May 23-27, 2016 (126 pages).
(Continued)

*Primary Examiner* — Ivan O Latorre
(74) *Attorney, Agent, or Firm* — Osha Bergman Watanabe & Burton LLP

(57) ABSTRACT

A wireless communication method includes transmitting, from a base station (BS), multiple downlink (DL) signals. The wireless communication method further includes receiving, with a user equipment (UE), two or more DL signals of the multiple DL signals, and notifying, with the BS, the UE of a number of the two or more DL signals. The two or more DL signals are associated with a Physical Random Access Channel (PRACH) resource.

10 Claims, 13 Drawing Sheets

(51) Int. Cl.
*H04W 16/28* (2009.01)
*H04W 74/00* (2009.01)
*H04W 74/02* (2009.01)

(52) U.S. Cl.
CPC ......... *H04W 16/28* (2013.01); *H04W 74/004* (2013.01); *H04W 74/006* (2013.01); *H04W 74/02* (2013.01); *H04W 74/0891* (2013.01)

(58) Field of Classification Search
CPC .. H04W 74/004; H04B 7/0617; H04B 7/0695
See application file for complete search history.

(56) References Cited

U.S. PATENT DOCUMENTS

| | | | | |
|---|---|---|---|---|
| 2017/0332407 | A1* | 11/2017 | Islam | H04W 74/0833 |
| 2017/0347380 | A1* | 11/2017 | Islam | H04W 52/42 |
| 2018/0070278 | A1* | 3/2018 | Uemura | H04W 36/24 |
| 2018/0219594 | A1* | 8/2018 | Zhang | H04L 5/0051 |
| 2019/0044782 | A1* | 2/2019 | Zeng | H04L 27/2613 |
| 2019/0104549 | A1* | 4/2019 | Deng | H04W 24/08 |

OTHER PUBLICATIONS

3GPP TSG-RAN WG1 #86; R1-167059; "On the random access procedure;" Ericsson; Gothenburg, Sweden; Aug. 22-26, 2016 (4 pages).
3GPP TSG-RAN WG1 #86; R1-167058; "On PRACH preamble design;" Ericsson; Gothenburg, Sweden; Aug. 22-26, 2016 (5 pages).
3GPP TSG-RAN WG1 #86; R1-167265 "Frame Structure Support for Beam Based Common Control Plane" Nokia, Alcatel-Lucent Shanghai Bell, Verizon Wireless; Gothenburg, Sweden; Aug. 22-26, 2016 (5 pages).
3GPP TSG-RAN WG1 #86; R1-167280 "Multi-Beam Common Control Plane Design" Nokia, Alcatel-Lucent Shanghai Bell, Verizon Wireless; Gothenburg, Sweden; Aug. 22-26, 2016 (5 pages).
Office Action issued in Japanese Application No. 2019-511973; dated Aug. 4, 2020 (8 pages).
International Search Report issued in corresponding Application No. PCT/US2017/054146, dated Dec. 21, 2017 (6 pages).
Written Opinion issued in corresponding Application No. PCT/US2017/054146, dated Dec. 21, 2017 (5 pages).

* cited by examiner

BW: Bandwidth

PHICH: Physical HARQ Indicator Channel

CRC: Cyclic Redundancy Check

FIG. 8

| DL Signal Group Index (Beam Index) | DL SS sequence |
|---|---|
| DL Signal Group a | SS Sequence a (or set a) |
| DL Signal Group b | SS Sequence b (or set b) |
| DL Signal Group c | SS Sequence c (or set c) |

WIRELESS COMMUNICATION METHOD, BASE STATION, AND USER EQUIPMENT USING A PHYSICAL RANDOM ACCESS CHANNEL

TECHNICAL FIELD

The present invention generally relates to a wireless communication method and a base station and, more particularly, to a method for downlink signal transmission in a wireless communication system.

BACKGROUND ART

At the beginning of communication, a user equipment (UE) (or user terminal (UT)) must perform a cell search. When the UE starts searching for the network, there is a possibility that there are many networks or, to put in other words, there are many frequencies from different operators available in the air, to which UE can connect. Therefore, a UE needs to synchronize to each frequency and check whether the frequency is from the correct operator to which the UE wants to connect. The UE performs these steps by going through an initial synchronization process. Cell synchronization is the first step when UE wants to camp on any cell. From doing so, the UE acquires a physical cell ID (PCI), time slot and frame synchronization, which will enable UE to read system information blocks from a particular network. The UE will tune its radio turn by turning to different frequency channels depending upon which bands it is supporting. Assuming that it is currently tuned to a specific band/channel, the UE first finds a Primary Synchronization Signal (PSS) of the subframe 0 which is located in an Orthogonal Frequency Division Multiplexing (OFDM) symbol located as in FIG. 1A. This enables the UE to be synchronized on subframe level. The PSS is repeated in subframe 5, which means the UE is synchronized on 5 ms basis since each subframe is 1 ms. From PSS, the UE is also able to obtain physical layer identity (0 to 2). In the next step, the UE finds the Secondary Synchronization Signal (SSS). SSS symbols are also located in the same subframe of PSS but before PSS, as shown in FIG. 1B. From SSS, the UE is able to obtain physical layer cell identity group number (0 to 167).

Once synchronized, the UE reads the master information block (MIB) and System Information Blocks (SIBs) to check whether this is the correct PLMN. Assuming that the UE finds that PLMN value to be correct, the UE will proceed with reading SIB1 and SIB2 to obtain important cell access related parameters. The next step is known as Random Access Procedure in which the network for the first time knows that some UE is trying to get access.

At this stage, the UE does not have any resource or channel available to inform network about its desire to connect, so the UE will send a request over the shared medium. There are two possibilities at this stage. First, there may be many other UEs in the same area (same cell) sending the same request, in which case there is a possibility of collision among the requests coming from various other UEs. Such random access procedure is called contention-based Random access procedure. In a second scenario, the network can inform the UE to use some unique identity to prevent its request from colliding with requests coming from other UEs. The second scenario is called contention-free or non-contention-based random access procedure.

(Initial Random Access Procedure)

In Long Term Evolution (LTE), a contention-based random access procedure consists of the following four-steps.

At a first step, initial synchronization and cell search may be performed. The PSS/SSS provides coarse time/frequency sync as well as cell ID, radio frame timing and CP length identification. In the cell search/selection, Reference Signal Received Quality (RSRP) measurement based on a downlink (DL) Cell-specific RS (CRS).

At a second step, essential system information may be broadcasted. A base station (BS) (Transmission and Reception Point (TRP)) may broadcast the MIB on a Physical Broadcast Channel (PBCH) (possibly requiring SIB on Physical Downlink Shared Channel (PDSCH)) using DL Cyclic Redundancy Check (CRC)-based channel estimation.

At a third step, random access may be performed. The UE may transmit a Physical Random Access Channel (PRACH) in allocated resources for random access.

At a fourth step, the UE may receive a random access response from the BS.

In the initial random access procedure, first, the UE detects a synchronization signal (SS) and decodes the broadcasted system information, followed by transmitting a PRACH preamble in uplink. The PRACH Configuration Index included in SIB2 indicates at which frame and subframe that UE is allowed to transmit a PRACH Preamble as well as the PRACH preamble type, as defined in the 3GPP specification TS36.211, Table 5.7.1-2. The BS replies with a Random Access Response (RAR), and the UE transmits a message 3 in the uplink.

(Massive MIMO Systems Over Higher Carrier Frequency)

Free space path loss increases with carrier frequency. Transmission in millimeter wave (mmWave) systems could additionally suffer from non-line-of-sight losses, e.g, diffraction loss, penetration loss, Oxygen absorption loss, foliage loss, etc. During initial access, the BS and the UE need to overcome these high path losses and discover each other. The deployments of Massive Multi-Input-Multi-Output (MIMO) (M-MIMO) technology are becoming very attractive candidates for future radio access technologies. This is partly due to the promise of Massive MIMO for providing larger coverage by using beamforming to compensate for the high free space path loss and additional non-line-of-sight losses.

A heterogeneous network is illustrated in FIG. 2, where Remote Radio Heads (RRHs) in the left figure are deployed in 4G LTE using 3.5 GHz bands to serve UEs in several hotspots within the Macro cell coverage. When the RRHs in the right figure are deployed in the spectrum at higher carrier frequency, such as mmWave bands, the propagation is hostile and the free-space propagation loss is higher and the diffraction losses as well as the penetration losses are higher. All these significant propagation losses will reduce the original coverage of each RRH in the lower frequency bands. However, higher frequencies also offer opportunities, because the antenna elements get smaller. Thus, it becomes possible to pack more elements into a smaller antenna. For example, a state-of-the-art antenna for 2.6 GHz is roughly one meter tall, and contains 20 elements. At 15 GHz, it is possible to design an antenna with 200 elements that is only 5 cm wide and 20 cm tall. With more antenna elements, it becomes possible to steer the transmission towards the intended receiver. Therefore, the Massive MIMO per RRH is used to concentrate the transmission in a certain direction so that the coverage is significantly improved. If a RRH transmitter is equipped with a very large number of transmit antennas (e.g., 32, 62, or 100) that can be used simultaneously for transmission to multiple UTs with much less number of the receive antennas (e.g., 1, 2, 4, etc.).

The multi-beam initial access may be necessary for covering a DL coverage area and/or UL coverage distance when higher carrier frequency is employed. The transmitter beamforming and receiver beamforming at the BS should be used. The overhead and complexity of initial access can be greatly reduced if Transmission (Tx)/Reception (Rx) reciprocity at BS and/or UE is available. This is because BS and/or UE may regard the best or acceptable Tx (or Rx) beam as the best or acceptable Rx (or Tx) beam. One example of multi-beam based approaches is beam sweeping. When beam sweeping is applied for a signal (or a channel), the signal (the channel) is transmitted/received on multiple beams, which are on multiple time instances in finite time duration [1].

(Hybrid Analog/Digital Beamforming)

On the other hand, the generation of transmitter/receiver beamforming should consider the MIMO implementation. Digital beamforming is the most flexible, where the phase control and amplitude signal control can achieve better steering precision, but is more expensive. Analog beamforming is the least flexible, because the same beamforming is applied to the whole signal bandwidth with the phase shifters but no magnitude of beamforming elements, as shown in FIG. 3A, which provides poor performance while being much less complex. Hybrid beamforming, as illustrated in FIG. 3B, is a combination of digital and analog beamforming, which is assumed as the beamforming baseline for multi-beam initial access.

At the BS transmission (Tx) side, beam sweeping is used to send multiple SS beams in different transmission timings of the SS. At the receiver side, the UE can be identify which SS beam is best. Assuming Tx/Rx reciprocity in TDD systems, the same reception (Rx) beamforming could be used to receive the UL signals for random access, such as PRACH, to maintain the same DL/UL coverage. The association between Tx beamforming to send DL signals (such as SS, measurement reference signal (MRS), MIB and SIB) and the Rx beamforming for UL signal reception (such as PRACH) needs to be defined.

(Conventional Method 1)

There are two methods to define the relation between DL SS and UL PRACH resources [2]. In a conventional method 1, a fixed timing order is used as the association between the each SS beam and PRACH resources. The timing offset for each Tx/Rx beam is preconfigured or configured with broadcast system information. The UE selects the best DL beam(s) by using Tx beamforming based on DL SS measurement. The UL PRACH is transmitted at the timing/duration that the BS use the Rx beamforming same as the selected Tx beamforming for PRACH reception. Therefore, the UE have the knowledge of the Rx beam sweeping at the BS side and the Rx beam sweeping has same pattern (beam order/number) as that of Tx beam sweeping.

(Conventional Method 2)

In a conventional method 2, the common PRACH resources are defined for DL SS beams, that is, the PRACH transmission starts from the same timing and has the same transmission duration. This method may have lower resource overhead compared to conventional method 1. Alternatively, with a design with similar PRACH resource overhead for method 1 and 2, a longer PRACH preamble can be transmitted with this method 2.

When detecting the PRACH preamble, the BS may switch different Rx analog beamforming [3], where the Rx beam sweeping as well as the Rx beam generation is transparent to the UE.

CITATION LIST

Non-Patent Reference

[Non-Patent Reference 1] RANI Chairman's Notes, 3GPP TSG-RAN WG1#85, Nanjing, China 23rd-27 May 2016.
[Non-Patent Reference 2] R1-167059, "On the random access procedure," Ericsson, 3GPP TSG-RAN WG1#86, Gothenburg, Sweden, Aug. 22-26, 2016.
[Non-Patent Reference 3] R1-167058, "On PRACH preamble design," Ericsson, 3GPP TSG-RAN WG1#86, Gothenburg, Sweden, Aug. 22-26, 2016

SUMMARY OF THE INVENTION

In accordance with one or more embodiments of the present invention, a wireless communication method includes transmitting, from a base station (BS) to a user equipment (UE), multiple downlink (DL) signals that are divided into DL signal groups, allocating, with the BS, a Physical Random Access Channel (PRACH) resource in each of the DL signal groups.

In accordance with one or more embodiments of the present invention, a base station (BS) includes a transmitter that transmits, to a user equipment (UE), multiple downlink (DL) signals that are divided into DL signal groups, and a processor that allocates a Physical Random Access Channel (PRACH) resource in each of the DL signal groups.

Other embodiments and advantages of the present invention will be recognized from the description and figures.

BRIEF DESCRIPTION OF THE DRAWINGS

FIG. 8 is a table diagram showing a DL signal group index associated with a DL SS sequence according to one or more embodiments of the present invention.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1A:
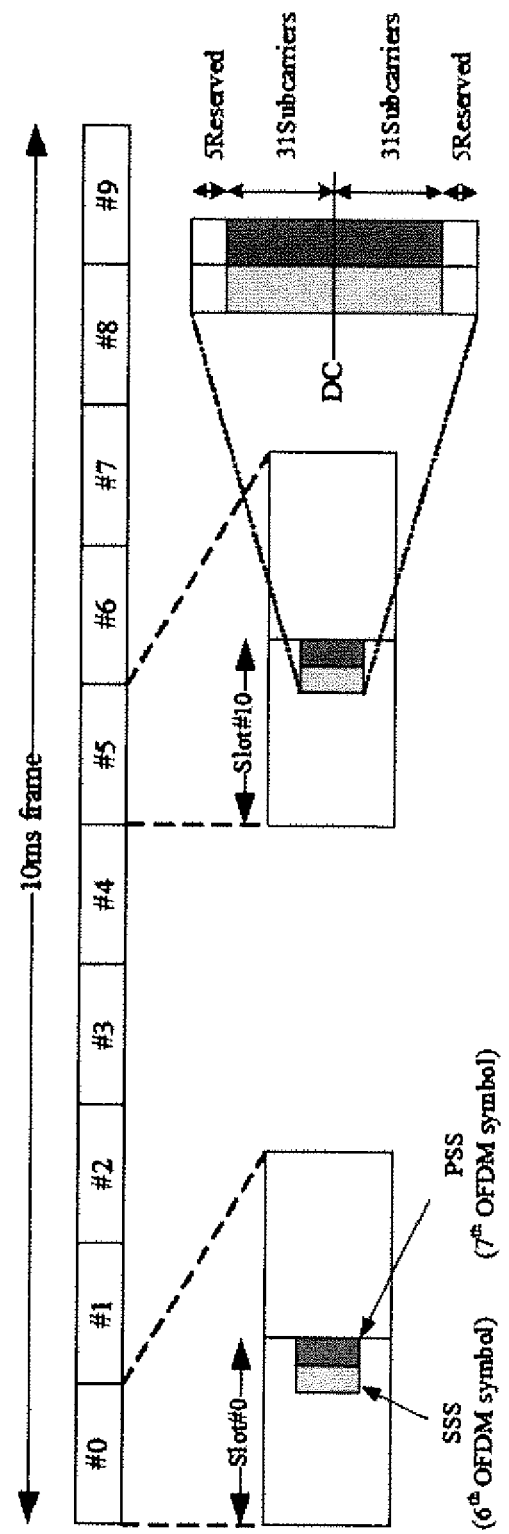
FIGS. 1A and 1B are diagrams showing PSS/SSS frame structure type 1 (FDD mode) and type 2 (TDD mode), respectively, according to conventional LTE standard.
Figure 1B:
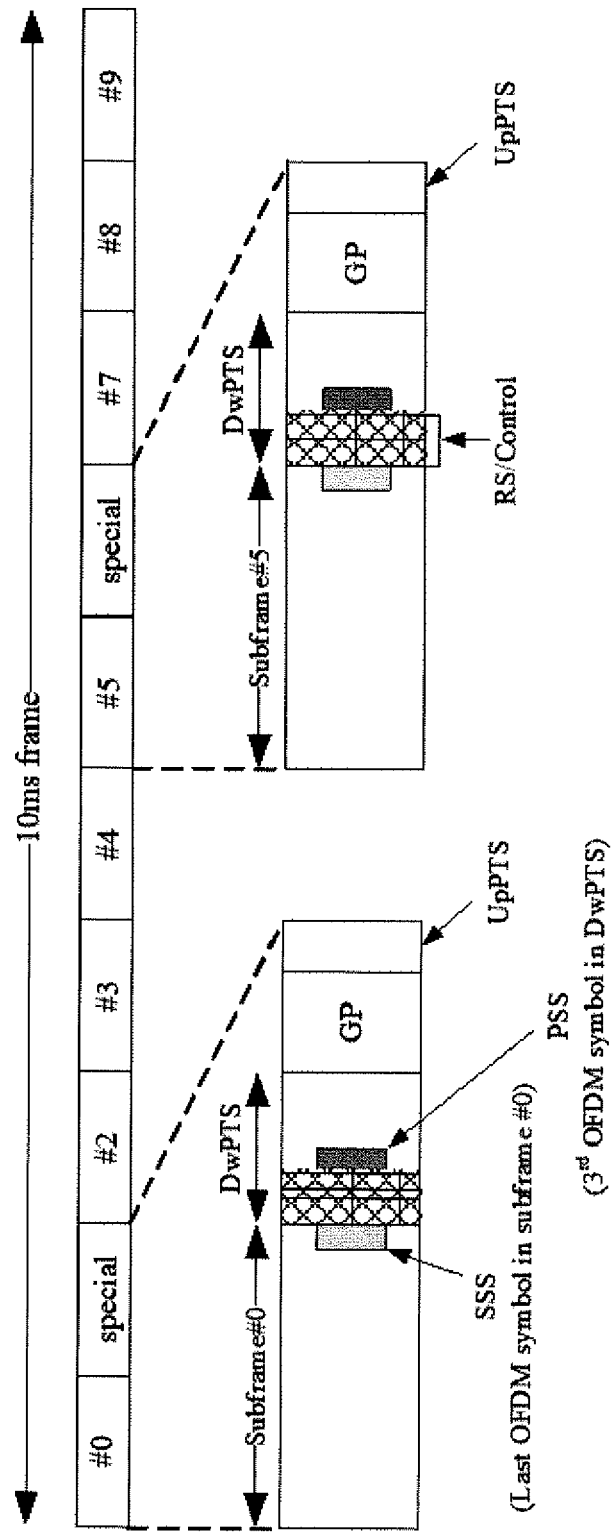
Figure 2:
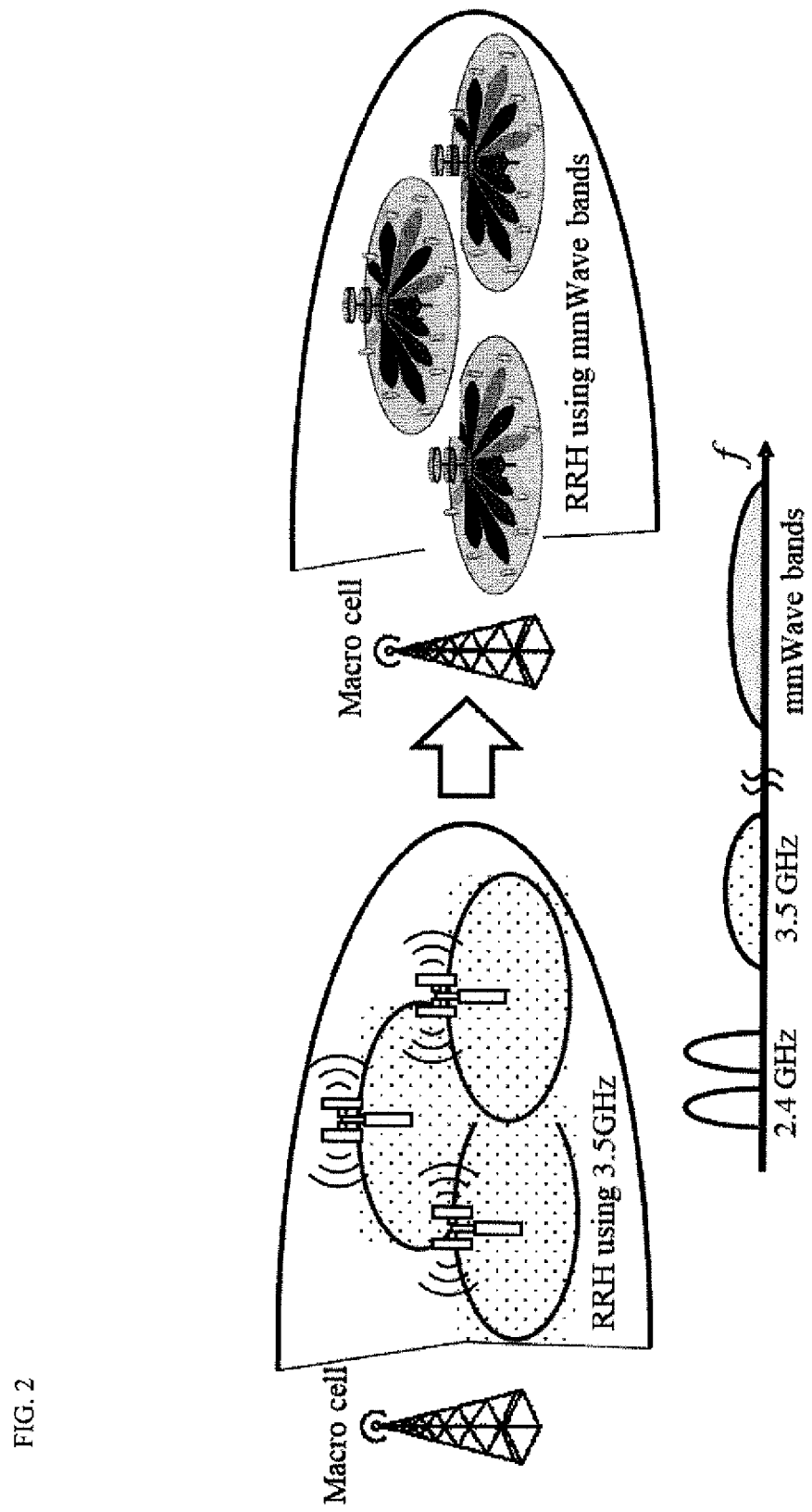
FIG. 2 is a diagram showing Massive MIMO systems on mmWave bands, according to conventional LTE standard.
Figure 3A:
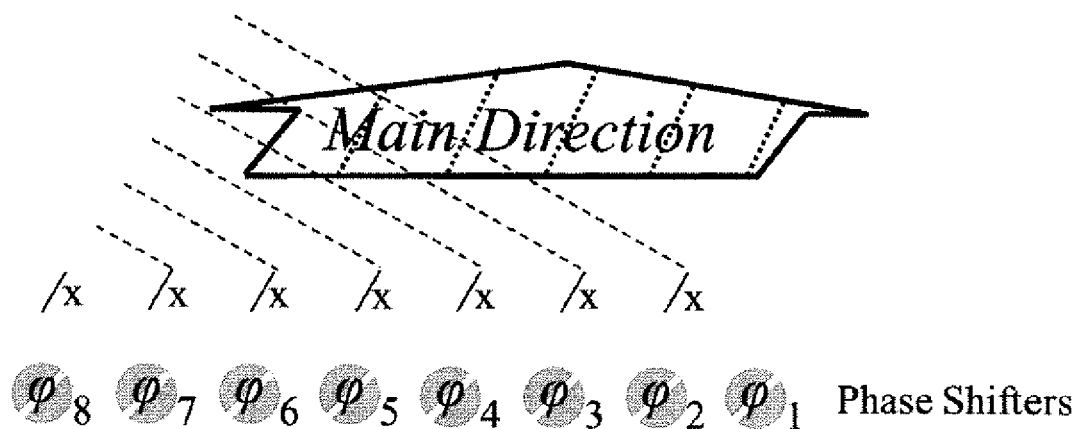
FIGS. 3A and 3B are diagrams showing analog beamforming implementation Hybrid beamforming implementation, respectively, according to conventional LTE standard.
Figure 3B:
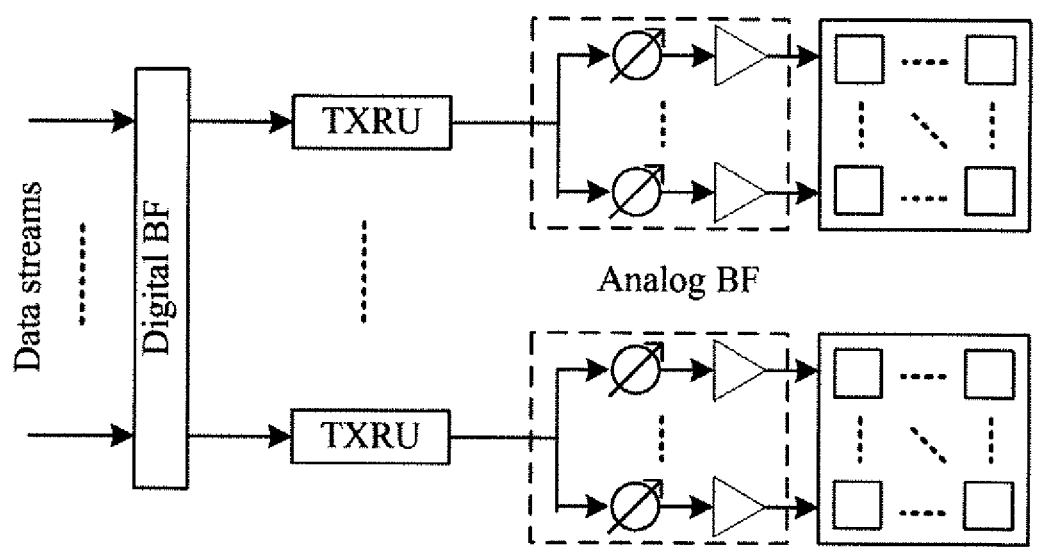
Figure 4:
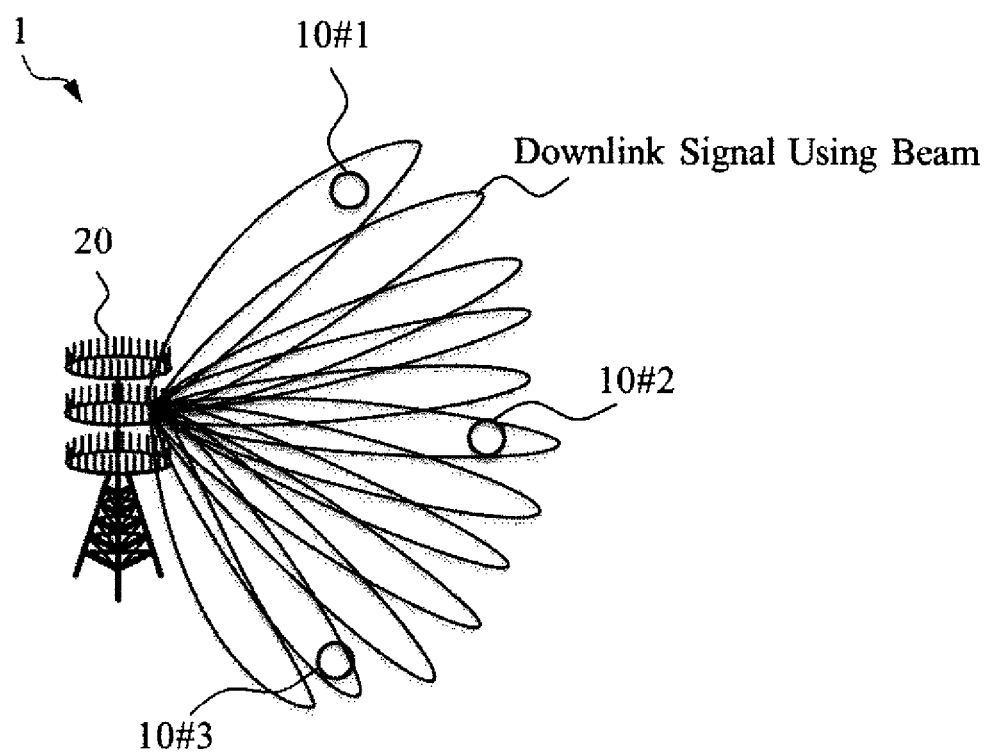
FIG. 4 is a diagram showing a configuration of a wireless communication system according to one or more embodiments of the present invention.

FIG. 4 is a wireless communications system 1 according to one or more embodiments of the present invention. The wireless communication system 1 includes user equipments (UEs) 10 (UEs 10#1-#3) and a base station (BS) 20. The wireless communication system 1 may be a New Radio (NR) system. The wireless communication system 1 is not limited to the specific configurations described herein and may be any type of wireless communication system such as an LTE/LTE-Advanced (LTE-A) system.

The BS 20 may communicate uplink (UL) and downlink (DL) signals with the UE 10 in a cell of the BS 20. The DL and UL signals may include control information and user data. The BS 20 may communicate DL and UL signals with the core network 30 through backhaul links 31. The BS 20 may be a gNodeB (gNB). The BS 20 may be referred to as a TRP. For example, when the wireless communications system 1 is a LTE system, the BS may be an evolved NodeB (eNB). As show in FIG. 4, the BS 20 may transmit multiple DL signals using multiple beams to the UE 10. In other words, the BS 20 may transmit multiple DL signals with beam sweeping.

The BS 20 includes antennas, a communication interface to communicate with an adjacent BS 20 (for example, X2 interface), a communication interface to communicate with the core network (for example, S1 interface), and a Central Processing Unit (CPU) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous gNBs 20 may be disposed so as to cover a broader service area of the wireless communication system 1.

The UE 10 may communicate DL and UL signals that include control information and user data with the BS 20 using Multi Input Multi Output (MIMO) technologies. The UE 10 may be a mobile station, a smartphone, a cellular phone, a tablet, a mobile router, or information processing apparatus having a radio communication function such as a wearable device.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

One or more embodiments of the present invention configure the UL PRACH resources for a group of Tx beams (or a group of DL signals), where each group of Tx beams share the same Tx analog beamforming. The Rx analog beamforming to receive the UL PRACH on the allocated PRACH resources should be same as the Tx analog beamforming of the DL signal group. In other words, it is the partial association between the Tx beam sweeping of DL signal transmission and Rx beam sweeping of PRACH reception to match the Tx/Rx analog beamforming only. In one or more embodiments of the present invention, the DL signal may be a SS, a Broadcast Channel (BCH), and a Demodulation Reference Signal (DM-RS).

The Tx beam sweeping has to switch every narrow beam generated by analog/digital beamforming in different time slots due to the Tx power limitation and to avoid inter-beam interference. On the other hand, the Rx beam sweeping is different, where the analog beamforming is switched in a Time Division Multiplexing (TDM) mode but multiple digital beamformings/digital filterings could be processed in parallel within each analog beamforming period.

The beam sweeping of DL SS transmission is illustrated as in FIG. 5, where each SS beam is sent at different time slot respectively. The Tx beams divided into several DL signal groups according to the Tx analog beamforming. The UL PRACH resources are configured per DL signal group. Assuming the same Tx/Rx analog beamforming, the PRACH resources for the DL signal group using the Tx analog beamforming should be received by the same Rx analog beamforming at the BS side. The association between a Tx DL signal group and the PRACH resources for the same Rx analog beamforming may be pre-defined or informed to UE through broadcast system information (MIB/SIB). Within the period per Rx analog beamforming, the parallel Rx digital beamforming/digital filtering processing could be transparent to UE. According to hybrid Rx analog/digital beamforming, the best Rx beam detected by BS will be same as the best Tx beam selected by UE.

The PRACH resources for each Rx analog beamforming could be configured independently, including the time offset, duration, frequency offset as well as the PRACH format. This is because each Tx/Rx analog beamforming may have various beam coverage, shape, the number of narrow beams generated by digital beamforming, the channel environment as well as the traffic load and user distribution.

Figure 5A:
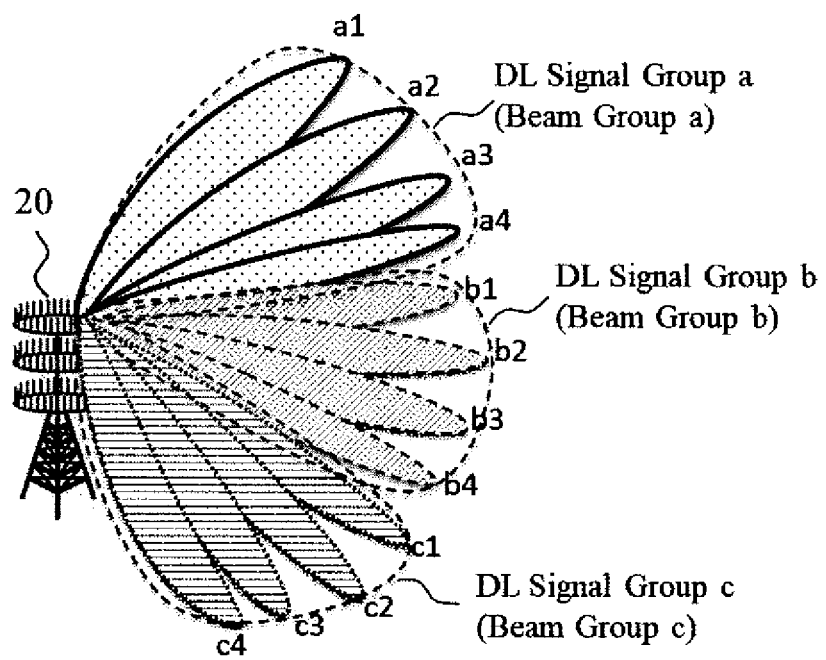
FIGS. 5A and 5B are diagrams showing association between DL signal groups and PRACH resources according to one or more embodiments of the present invention.
Figure 5B:
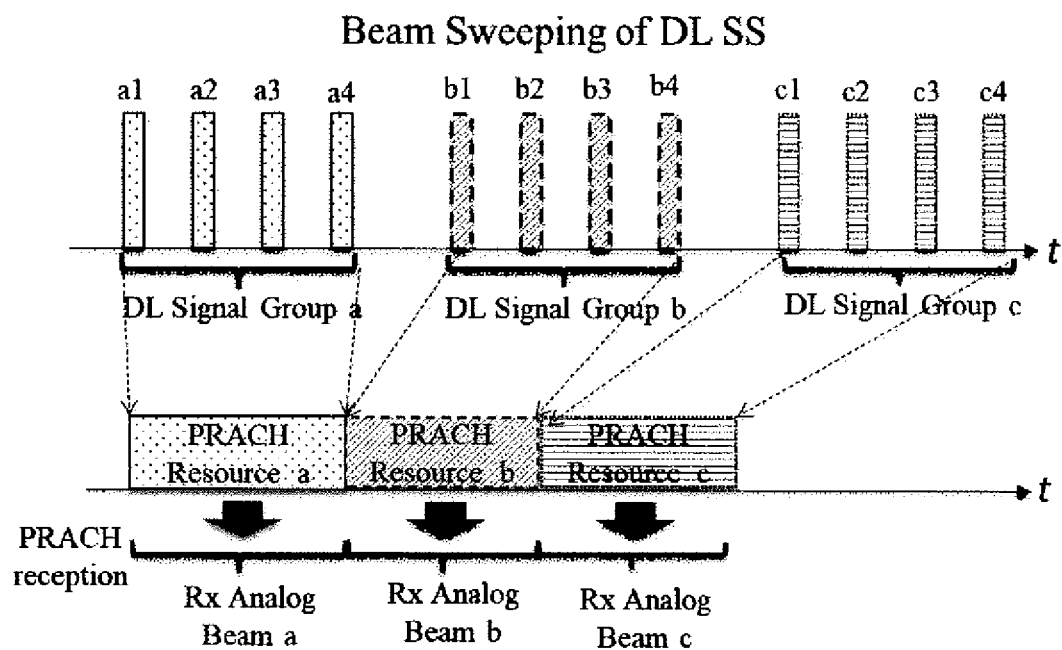

According to one or more embodiments of the present invention, the BS 20 may transmit, to the UE 10, multiple DL signals that are divided into DL signal groups and allocate the PRACH resource in each of the DL signal groups. FIGS. 5A and 5B are diagrams showing association between DL signal groups and PRACH resources according to one or more embodiments of the invention. In an example of FIGS. 5A and 5B, the DL signal may be the SS. In one or more embodiments of the present invention, the DL signal group may be referred to as a beam group.

According to one or more embodiments of the present invention, the BS 20 may notify the UE of a configuration of the DL signal groups. The BS 20 may notify the UE 10 of the configuration using at least one of a MIB and a SIB. The configuration indicates at least one of a number of the multiple DL signals, a number of DL signal groups, a number of the multiple DL signals in each of the DL signal groups, and a DL signal group index that identifies each of the DL signal groups. The multiple DL signals are transmitted using different multiple beams, respectively, and the configuration includes at least one of a beam index that identifies each of the multiple beams and the beam index in each of the DL signal groups.

As shown in FIG. 5A, the BS 20 may transmit multiple SSs a1-a4, b1-b4, and c1-c4. The SSs a1-a4 may be divided into a DL signal group a. The SSs b1-b4 may be divided into a DL signal group b. The SSs c1-c4 may be divided into a DL signal group c. Tx analog beams may be applied to the multiple SSs a1-a4, b1-b4, and c1-c4, respectively. Thus, the PRACH resources are allocated for different DL signal group a, b, and c, respectively.

In other words, there are total 12 beams transmitted in TDM mode and every 4 beams are sharing the same analog beamforming, e.g., {a1, a2, a3, a4} are generated by using Tx analog beam a, {b1, b2, b3, b4} are generated by using Tx analog beam b, and {c1, c2, c3, c4} are generated by using Tx analog beam c. {a1, a2, a3, a4} are regarded as the DL signal group a, {b1, b2, b3, b4} are regarded as the DL signal group b, and {c1, c2, c3, c4} are regarded as the DL signal group c. By detecting/comparing the multi-beam DL SS, the UEs who identify DL SS beam in DL signal group a will be allocated PRACH Resource_a, the Rx analog beamforming a is used for the PRACH reception. The PRACH Resource_b is allocated for the UEs that find the best DL SS beam(s) in DL signal group b and the Rx analog beamforming b is used for the PRACH reception. Similarly, the PRACH Resource_c is allocated for the UEs that find the best DL SS beam(s) in DL signal group c and the Rx analog beamforming c is used for the PRACH reception. In addition, the PRACH resources for different DL signal groups could be configured independently, which will be illustrated in the following embodiments.

The above conventional method 1 defines the one-by-one relationship between every Tx beam and Rx beam. The UE has to wait for the timing of target Rx beam (same as the selected Tx beam) to send its PRACH over the allocated PRACH resources. Therefore, the random access procedure for the TDM-based multi-beam transmission/reception takes longer time, especially in case of larger number of Tx/Rx beams.

The above conventional method 2 does not define the association between Tx and Rx beamforming. The common PRACH resources are allocated without the knowledge of Rx beamforming. The UEs transmit their PRACH over the common resources. It may take longer time for receiver to try different Rx beamforming. However, only if the Rx analog beamforming is same as the Tx analog beamforming, PRACH can be detected. When the Rx analog beamforming is different from that of the detected Tx beam, the PRACH transmission power is wasted because there is marginal contribution to the diversity gain.

Comparing with the above conventional methods, one or more embodiments of the present invention may have the following advantages:

flexible network-controlled configuration of the PRACH resources and transmission modes for each UE aligned with that of Rx Analog BF, considering the beam shape, beam coverage, user distribution;

no waste power on the Rx Analog BF different from the detected Tx Analog BF of the UE-detected Beam; and achieve PRACH detection combining gain over the duration using the Rx Analog BF same as the Tx Analog BF of the UE-detected Beam.

Figure 6A:
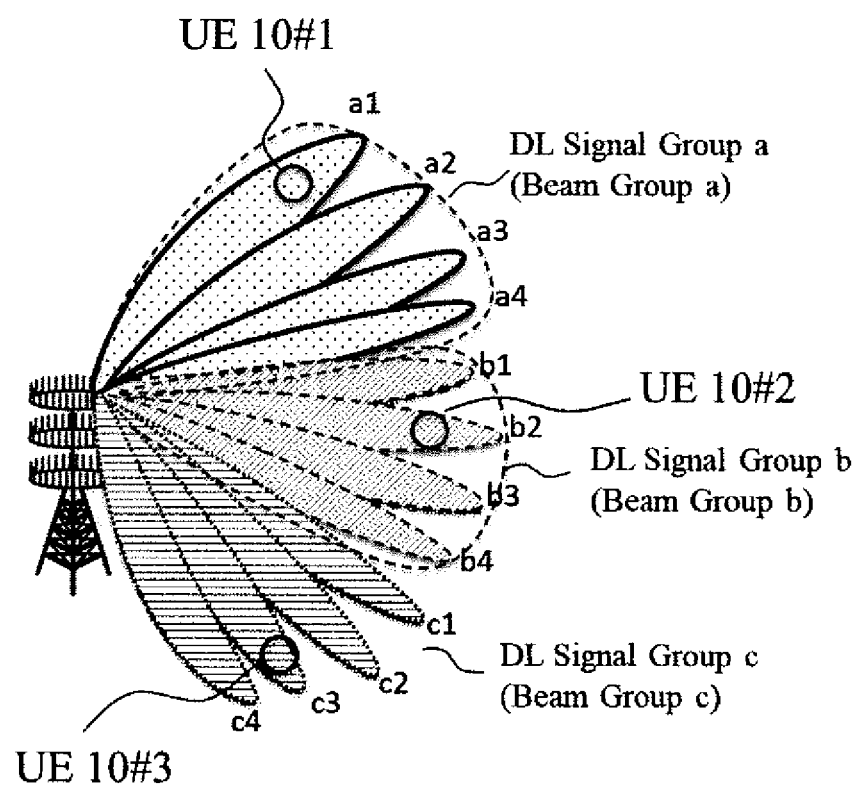
FIGS. 6A-6C are diagrams showing comparison examples between a method according to one or more embodiments of the present invention and conventional methods.
Figure 6B:
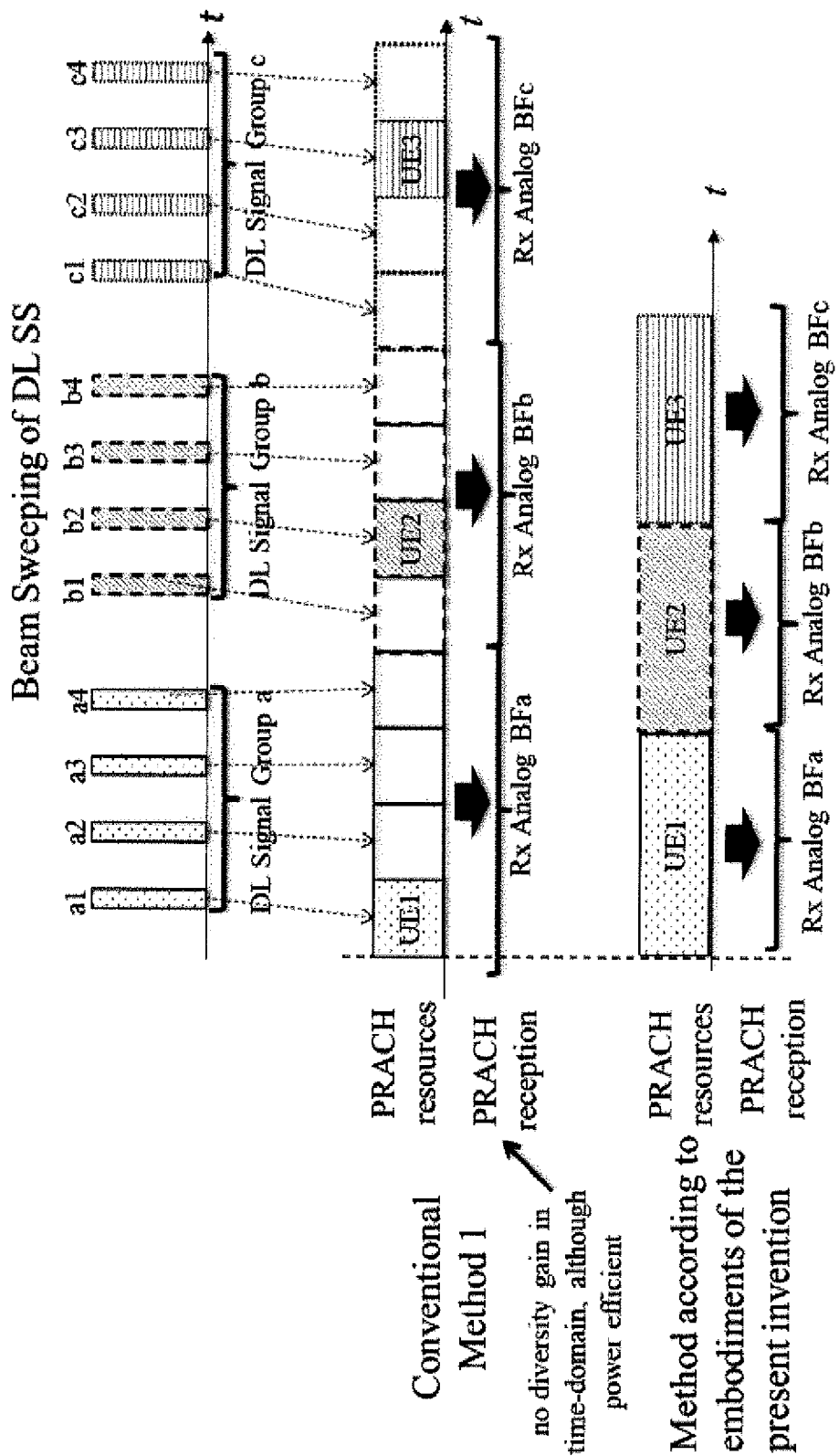
Figure 6C:
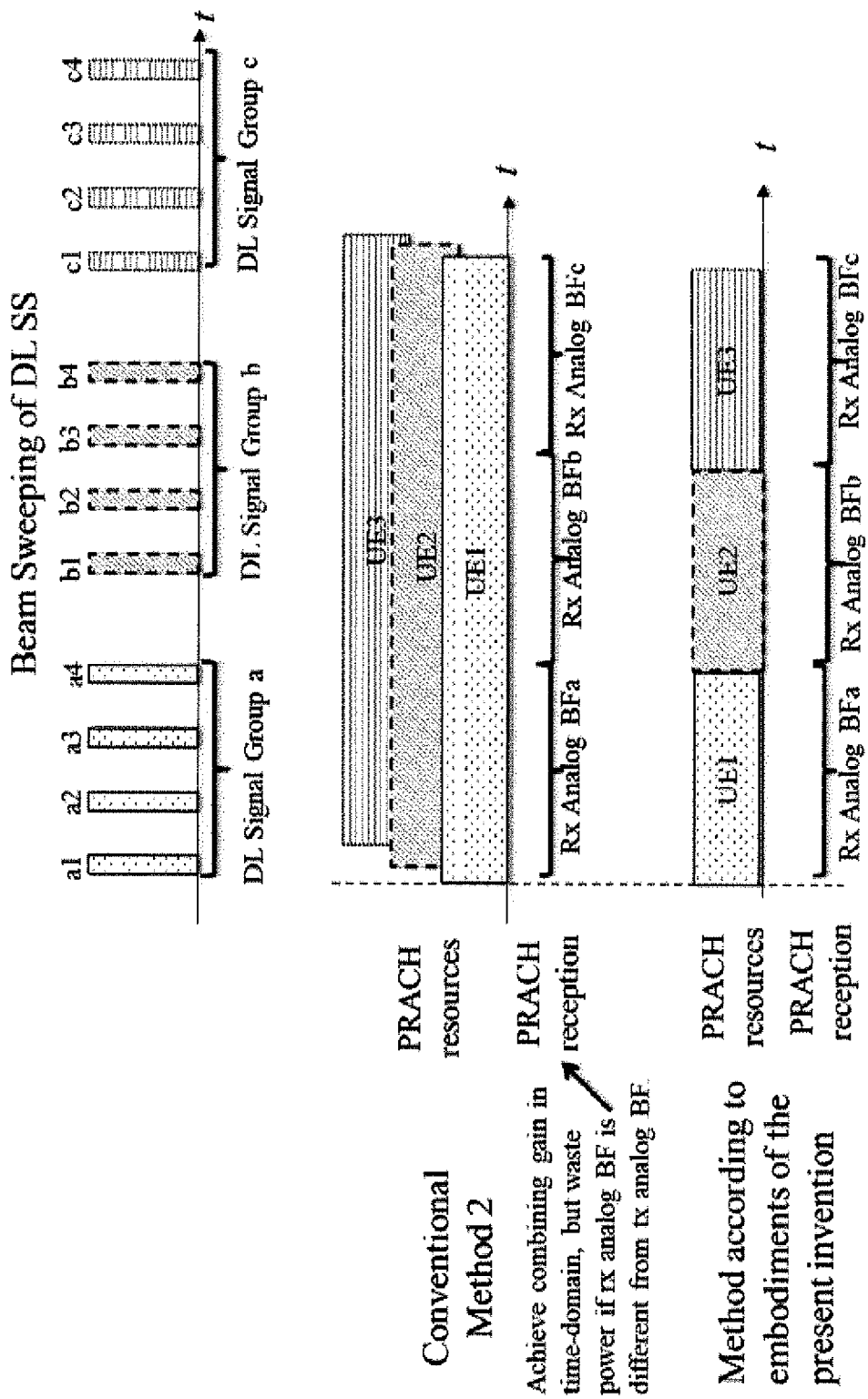

The comparison between a method according to one or more embodiments of the present invention and conventional methods is illustrated in FIGS. 6A-6C. FIG. 6A is a diagram showing a method of transmission of multiple DL signal that are divided into DL signal groups according to one or more embodiments of the present invention. In FIG. 6A, for example, the UEs 10#1 (UE1), 10#2 (UE2), and 10#3 (UE3) may receive the DL signals a1 (beam a1), b2, and c3, respectively.

In accordance with one or more embodiments of the present invention, a class of methods and apparatuses are disclosed, which allow increasing the network spectral efficiency per unit area in dense antenna/antenna-site network deployments. Methods rely on the combined use of appropriately designed pilot codes or reference signals (RS) for use in the uplink by active (scheduled) user terminals, and mechanisms for fast user detection at each antenna-site by the network. The designed uplink pilots can be used for uplink sounding procedure for channel estimation as well as uplink random access procedure.

First Example

In one or more embodiments of a first example of the present invention, how to indicate the configuration of the PRACH resources for multiple DL signal groups may be described. The signaling may include the configuration of DL signal groups for DL signal transmission (SS, BCH, DM-RS, MIB, and SIB) and the PRACH configuration for different DL signal groups.

The configuration of DL signal groups (beam group) may include, the maximum number of DL signals (beams), the maximum number of DL signal groups, the maximum number of DL signals (beams) per DL signal group, the total number of DL signals (beams), the number of DL signal groups, the number of DL signals (beams) per DL signal group, a beam index (beamIndex), a DL signal group index (groupIndex), and a beam index in DL signal group (beamIndex_groupIndx).

The PRACH configuration field for different DL signal groups may include:
rootSequenceIndex[groupIndex]
prach_ConfigIndex[groupIndex], which include
{
   prach_format[groupIndex]
   prach_frameIndex[groupIndex]
   prach_subframeIndex[groupIndex]
   prach_trasnmissionMode[groupIndex]
   prach_duration[groupIndex]
}
zeroCorrelationZoneConfig[groupIndex]
prach_FreqOffset[groupIndex]

Figure 7:
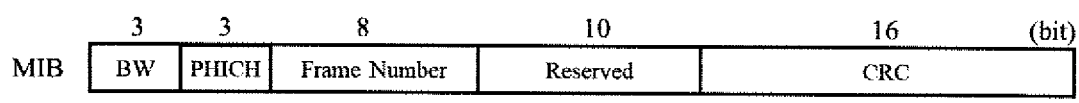
FIG. 7 is a diagram showing parameters indicated in MIB according to conventional LTE standard.

In LTE, the parameter "prach_ConfigIndex" in SIB2, defined in 3GPP specification TS36.211-Table 5.7.1-2, determines what type of preamble format should be used and at which system frame and subframe UE can transmit PRACH Preamble. The PRACH format defined in 3GPP specification TS36.211-Table 5.7.1-1 defines the length of PRACH sequences. The parameter "prach-FreqOffset" in SIB2 (together with PRACH format type for TDD) informs the UE and other neighbor cells know about which PRB is available for RACH access. In LTE, the parameters indicated in MIB are shown in FIG. 7. For example, parameters of the starting timing, the frequency offset, the duration, the PRACH format, the PRACH sequence, and the PRACH sequence set may be common values in each of the DL signal groups.

Considering backward compatibility, some parameters in the DL signal group configuration may be indicated in the reserved field of MIB and the parameters or partial parameters of DL signal group configuration and PRACH configuration field for different DL signal groups may be included in the SIB2. Also, some parameters, such as maximum number of beams, maximum number of DL signal groups, max number of beams per group, may be predefined to save the signaling overhead. In order to save the signaling overhead, some of the parameters may be implicitly indicated. For example, the DL signal group is identified by the beam-group-specific DL reference signal sequence or a set of DL reference signal sequences, as illustrated in FIG. 8.

Example 2

Figure 9:
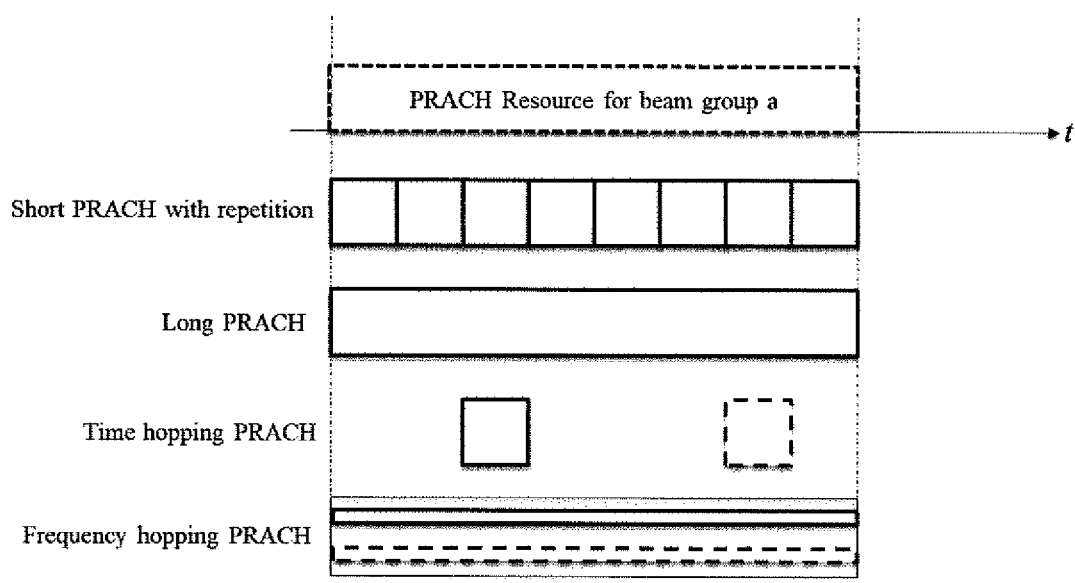
FIG. 9 is a diagram showing various PRACH transmission modes according to one or more embodiments of the present invention.

Regarding the UE behavior for random access, it is possible to define one or several transmission modes for PRACH. In one or more embodiments of a second example of the present invention, the network-controlled UL PRACH transmission mode per DL signal group may be indicated in MIB/SIB2, considering the traffic load, user distribution, channel environment, etc. Various PRACH transmission modes are illustrated in FIG. 9. During the PRACH resources allocated for a DL signal group, the PRACH may use short sequence with repetition, long sequence, random/scheduled hopping in different time slots/symbols, random/scheduled hopping in different resource blocks (RBs) or subcarriers.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A wireless communication method comprising:
   transmitting, from a base station (BS), multiple downlink (DL) signals;
   receiving, with a user equipment (UE), two or more DL signals of the multiple DL signals;
   notifying, with the BS, the UE of a number of the two or more DL signals assigned to a group; and
   controlling, with the UE, transmission of a Physical Random Access Channel (PRACH) based on the number of the two or more DL signals of the group,
   wherein the two or more DL signals are associated with a resource of the PRACH for the group, and
   wherein the multiple DL signals are Synchronization Signals (SSs).

2. The wireless communication method according to claim 1, further comprising:
   notifying, with the BS, the UE of a PRACH resource configuration.

3. The wireless communication method according to claim 2, wherein the PRACH resource configuration includes at least one of starting timing, a frequency offset, duration, a PRACH format, a PRACH sequence, and a PRACH sequence set in each of the DL signal groups.

4. The wireless communication method according to claim 3, wherein parameters of the starting timing, the frequency offset, the duration, the PRACH format, the PRACH sequence, and the PRACH sequence set are common values in each of the DL signal groups.

5. The wireless communication method according to claim 1, wherein the multiple DL signals are Broadcast Channels (BCHs) or Demodulation Reference Signals (DM-RSs).

6. The wireless communication method according to claim 1, wherein the number indicates a cardinality of the two or more DL signals.

7. A base station (BS) comprising:
   a transmitter that transmits, to a user equipment (UE):
      multiple downlink (DL) signals that comprise two or more DL signals; and
      a number of the two or more DL signals assigned to a group; and
   a processor that allocates the two or more DL signals to a Physical Random Access Channel (PRACH) resource for the group,
   wherein the processor controls a reception of the PRACH transmitted based on the number of the two or more DL signals from the UE for the group, and
   wherein the multiple DL signals are Synchronization Signals (SSs).

8. The BS according to claim 7, wherein the number indicates a cardinality of the two or more DL signals.

9. A user equipment (UE) comprising:
   a receiver that receives, from a base station (BS):
      two or more downlink (DL) signals; and
      a number of the two or more DL signals assigned to a group; and
   a processor that controls transmission of a Physical Random Access Channel (PRACH) based on the number of the two or more DL signals of the group,
   wherein the two or more DL signals are associated with a resource of the PRACH for the group,
   wherein the two or more DL signals are included in multiple DL signals transmitted from the BS, and
   wherein the multiple DL signals are Synchronization Signals (SSs).

10. The UE according to claim 9, wherein the number indicates a cardinality of the two or more DL signals.

* * * * *